Feb. 9, 1971     H. A. WILLETT     3,561,197
SUGARCANE TOPPER

Filed April 14, 1969     3 Sheets-Sheet 1

INVENTOR
HAROLD A. WILLETT

Feb. 9, 1971  H. A. WILLETT  3,561,197
SUGARCANE TOPPER

Filed April 14, 1969  3 Sheets-Sheet 3

INVENTOR
HAROLD A. WILLETT

United States Patent Office 3,561,197
Patented Feb. 9, 1971

3,561,197
SUGARCANE TOPPER
Harold A. Willett, Thibodaux, La., assignor to Cane Machinery & Engineering Company, Inc., Thibodaux, La., a corporation of Louisiana
Filed Apr. 14, 1969, Ser. No. 815,588
Int. Cl. A01d 45/02
U.S. Cl. 56—17      5 Claims

ABSTRACT OF THE DISCLOSURE

The apparatus of this disclosure is directed to topping of standing sugarcane prior to its being severed from the earth and provides a rotary hydraulic motor driving a cutter which assembly slides up and down on wear plates mounted on the harvester pickups. The cutter assembly has a lateral stabilizer which is captive with but slidable along the outer rails of each of the front end pickups.

---

An object of the present invention is the provision of a rotary cutter cane stalk topper which may be slidably carried by the harvester front end pickups to top cane stalks with a minimum of mechanism and motion and with precision.

A further object of the present invention is to provide a hydraulic topper to make maximum utilization of the hydraulic systems already on the harvester.

With the foregoing and other objects in view the invention will be more fully described hereinafter and more particularly pointed out in the appended claims.

In the drawings in which like parts are denoted by reference characters throughout the several views.

Figure 1:
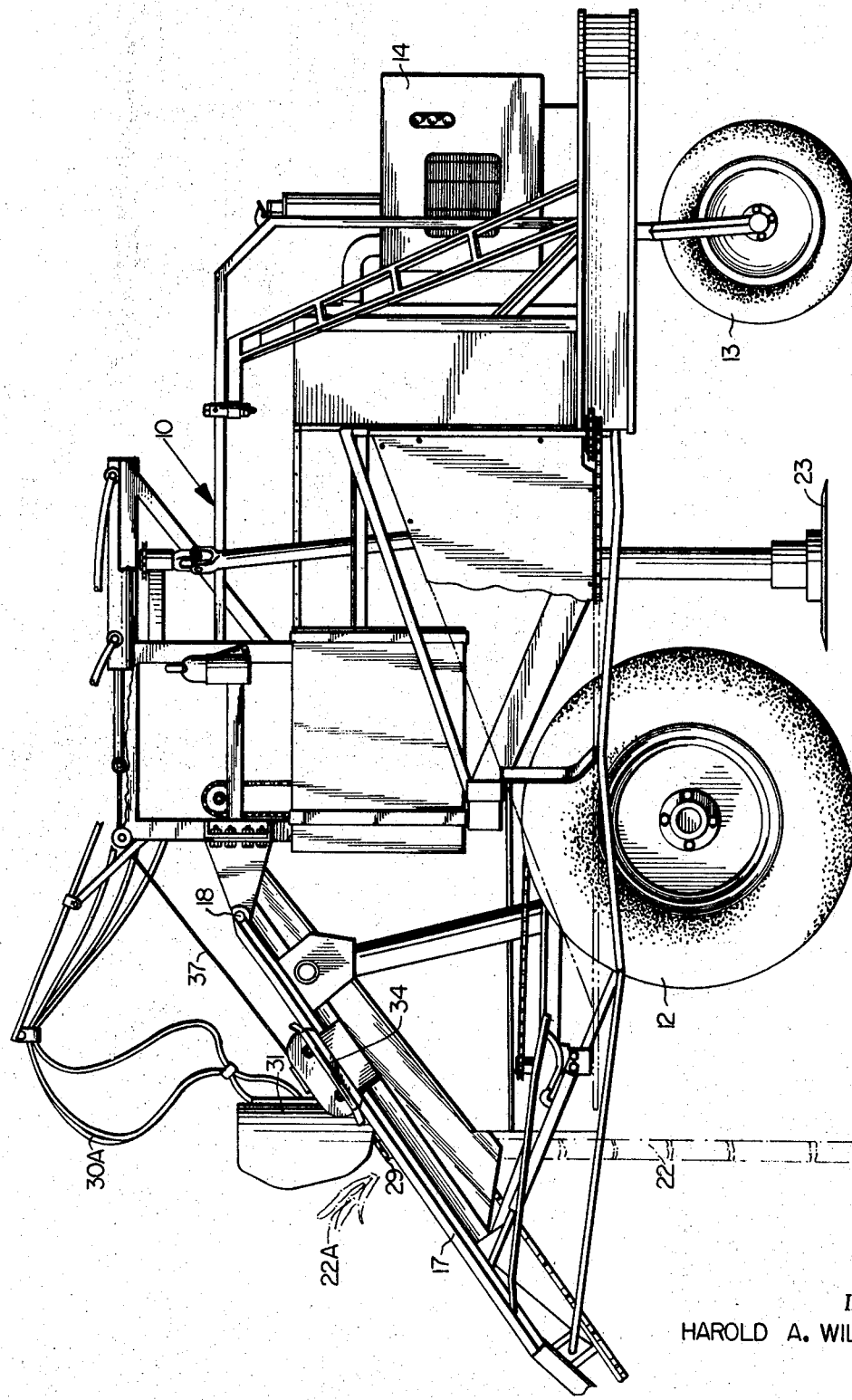
FIG. 1 is a side elevational view of a sugarcane harvester having parts broken away to show the cane stalk topper of the present invention.
Figure 2:
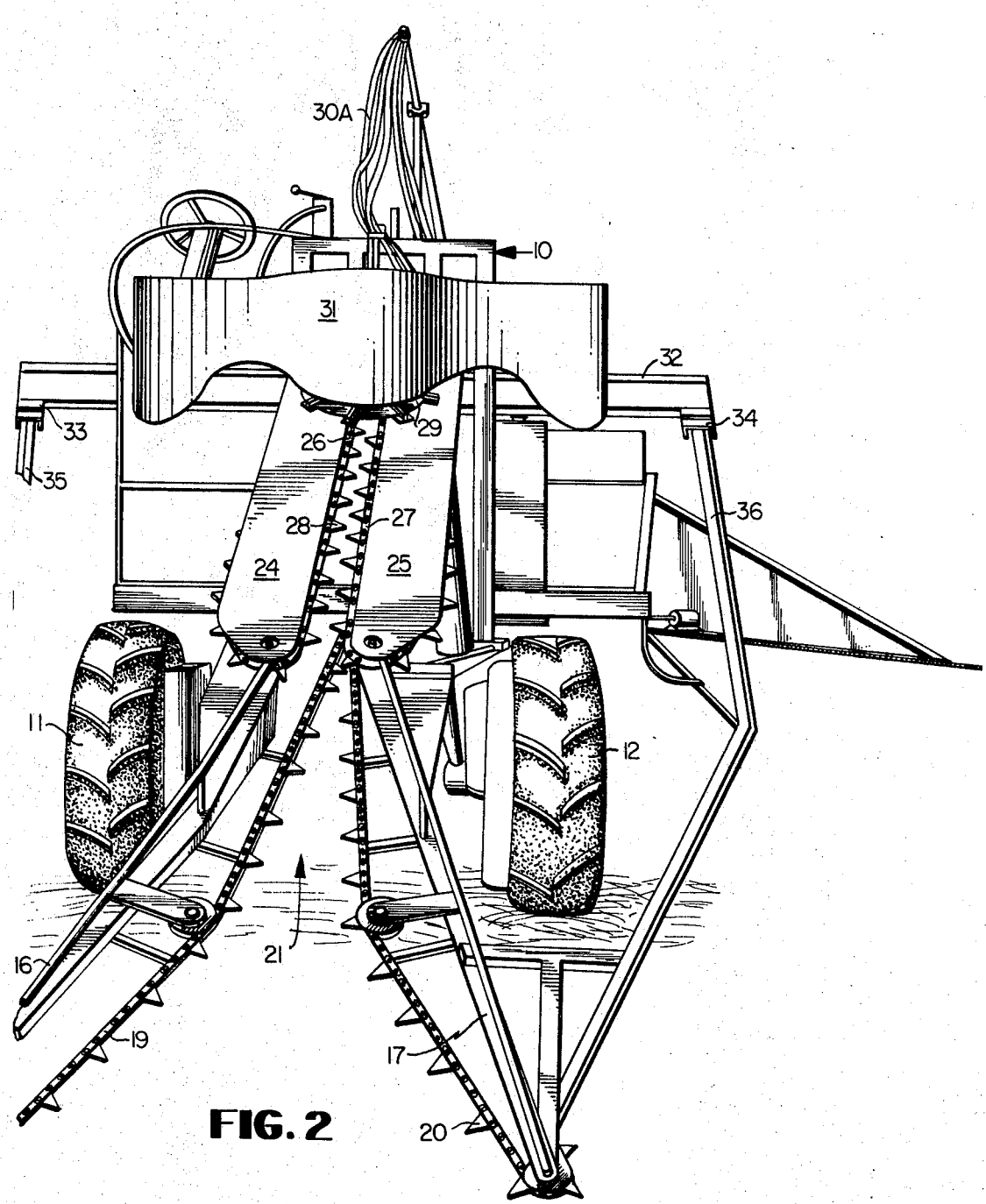
FIG. 2 is a front perspective view of the harvester of FIG. 1.
Figure 3:
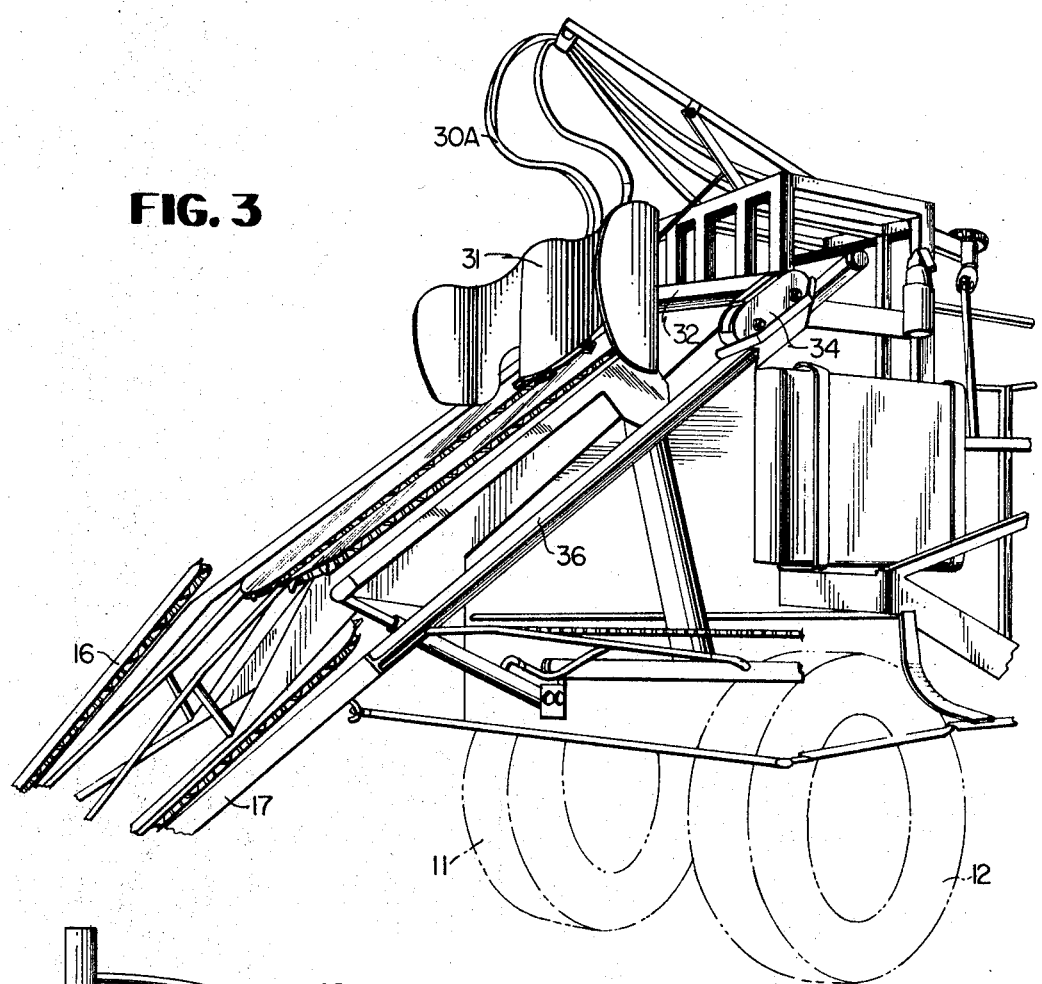
FIG. 3 is a front side perspective view of the harvester of FIG. 1.
Figure 4:
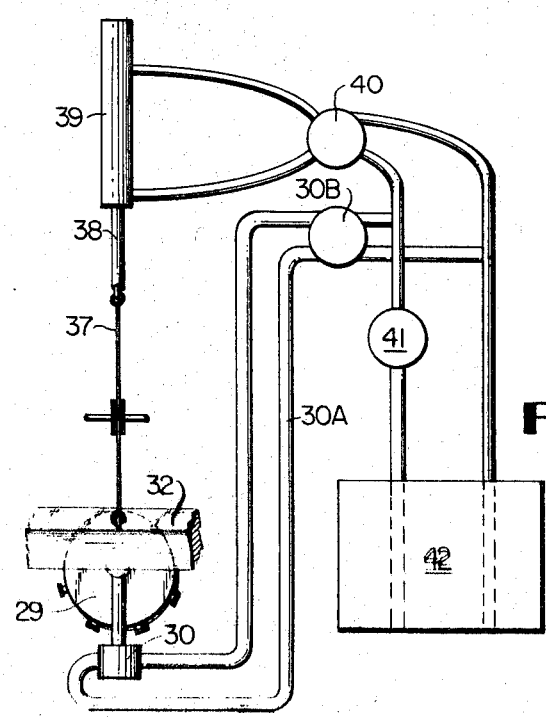
FIG. 4 is a hydraulic schematic of the cane stalk topper operating mechanism of the present invention.

Referring now to the drawings and for the moment to FIGS. 1 and 2, 10 designates a sugarcane harvester having two front drive wheels 11, 12 and a steering wheel 13. The harvester 10 is driven by a power plant 14 which drives a hydraulic pump 15 for pressurizing the hydraulic systems on the pickups, cutters and piler. Located at the front end of the harvester 10 are two pickup units 16 and 17 each of which is pivoted at its upper end to the harvester frame at 18. As best seen in FIG. 2 each pickup has the conventional power driven gathering chains 19 and 20 which define therebetween a cane receiving throat 21 through which passes standing sugarcane stalks 22 which are first topped to remove the top 22A and are subsequently severed from the earth by a rotary cutter 23 in the manner well known to this art.

Each of the front end pickups 16 and 17 has wear plates 24, 25 along the sides of the harvester throat through which the cane stalks 22 pass. Additional conveyor chains 26, 27 having projections 28 move the cane 22 into a rotary knife topper 29. The knife 29 is driven by a hydraulic motor 30 mounted in a slide assembly 31 which rides upon the wear plates 24, 25. Extending laterally of the harvester, as best seen in FIG. 2 a cutter stabilizing means 32 is shown attached at its mid point to the cutter assembly 31 and at its outer ends to guide shoes 33, 34 which are captive with the side rails 35, 36 of the pickups but slidable therealong.

Secured to the rear of the topper slide assembly 31 is one end of a cable 37. The other end of the cable 37 is secured to ram 38 operated by cylinder 39 under control of valve 40 in fluid circuit with a pressurizing pump 41 having a return sump 42. The cutter motor 30 is connected to the hydraulic system through lines 30A under control of valve 30B.

When the harvester enters a row of standing cane to be topped and cut, the cane stalks 22 enter the throat 21 between the pickups 16 and 17, the cane stalks 22 being still attached to the earth and the harvester moving thereover. The operator regulates the height at which the stalks 22 will be topped by controlling valve 40 to control the ram 38 to either pull up on cable 37 or to slack off and allow the topper cutter assembly 31 to move either up or down along the wear plates 24, 25 so that the rotary topper knife 29 will cut the top 22A from the cane stalk at the desired height.

What I claim is:

1. For use with downwardly declining front end pickups of a sugarcane harvester having a throat defined therebetween through which passes standing cane to be cut, a topper assembly comprising
   (a) a rotary topping knife driven by a hydraulic rotary cutter motor assembly,
   (b) wear plates one of each of which is carried by each pickup and which is positioned to slidably support the rotary cutter motor and knife,
   (c) cutter stabilizing means connected to the rotary cutter motor and extending laterally of the harvester across each pickup,
   (d) guide means carried by the outer free end of said stabilizing means and being slidable along a portion of the pickup, and
   (e) raising and lowering means one end of which is connected to the rotary cutter topper assembly and the other end of which is connected to the harvester for raising and lowering the topping knife in sliding engagement along the wear plates to cut the cane stalks at varying heights dependent upon cane maturity as they pass through the harvester throat.

2. A sugarcane topper as claimed in claim 1 wherein the wear plates extend along a portion of the throat area of the front end pickups of the harvester.

3. A sugarcane topper as claimed in claim 1 wherein the cutter stabilizing means is an outrigger boom connected proximate its center to the topper motor assembly and extends laterally across the front end pickups.

4. A sugarcane topper as claimed in claim 1 wherein said guide means are slidable shoe members which are captive with a pickup rail and slidable therealong.

5. A sugarcane topper as claimed in claim 1 wherein the raising and lowering means is a valve controlled hydraulic cylinder and ram unit having a cable connection between the ram and the topping knife assembly.

References Cited

UNITED STATES PATENTS

| | | | |
|---|---|---|---|
| 1,726,043 | 8/1929 | Scranton | 56—17 |
| 2,516,277 | 7/1950 | Vichie et al. | 56—17 |

ROBERT PESHOCK, Primary Examiner

U.S. Cl. X.R.

56—63